US008055216B2

(12) United States Patent
Dent

(10) Patent No.: US 8,055,216 B2
(45) Date of Patent: Nov. 8, 2011

(54) ANTENNA MATCHING FOR MIMO TRANSCEIVERS

(75) Inventor: Paul Wilkinson Dent, Pittsboro, NC (US)

(73) Assignee: Sony Ericsson Mobile Communications AB, Stockholm (SE)

( * ) Notice: Subject to any disclaimer, the term of this patent is extended or adjusted under 35 U.S.C. 154(b) by 453 days.

(21) Appl. No.: 12/412,916

(22) Filed: Mar. 27, 2009

(65) Prior Publication Data

US 2010/0248651 A1 Sep. 30, 2010

(51) Int. Cl.
*H04B 1/04* (2006.01)
(52) U.S. Cl. ............. 455/114.2; 455/101; 333/109
(58) Field of Classification Search ............. 455/78, 455/101, 114.2; 333/109
See application file for complete search history.

(56) References Cited

U.S. PATENT DOCUMENTS

| 3,255,450 | A | * | 6/1966 | Butler | 342/373 |
| 3,295,134 | A | * | 12/1966 | Lowe | 342/368 |
| 3,495,263 | A | * | 2/1970 | Noach et al. | 343/777 |
| 4,313,220 | A | | 1/1982 | Lo et al. | |
| 4,434,397 | A | * | 2/1984 | Nelson | 324/630 |
| 5,032,802 | A | * | 7/1991 | Fry | 333/109 |
| 7,120,199 | B2 | | 10/2006 | Thielecke et al. | |
| 2006/0098765 | A1 | | 5/2006 | Thomas et al. | |
| 2008/0258993 | A1* | | 10/2008 | Gummalla et al. | 343/876 |
| 2009/0219213 | A1* | | 9/2009 | Lee et al. | 343/700 MS |
| 2010/0069011 | A1* | | 3/2010 | Carrick et al. | 455/63.1 |

FOREIGN PATENT DOCUMENTS

| EP | 0470786 A2 | 2/1992 |
| JP | 1305730 A | 12/1989 |
| JP | 2151133 A | 6/1990 |
| WO | 2007124766 | 11/2007 |
| WO | 2008030165 | 3/2008 |

OTHER PUBLICATIONS

U.S. Appl. No. 11/963,884, filed Dec. 24, 2007 entitled "New Passive Fourier Transform Circuits and Butler Matrices".
J. Bach Andersen and H.H. Rasmussen, "Decoupling and Descattering Networks for Antennas," IEEE Transactions on Antennas and Propagation, Nov. 1976, pp. 841-846.
S. Dossche, S. Blanch, and J. Romeu, "Optimum antenna matching to minimise signal correction on a two-port antenna diversity system," Electronics Letters, vol. 40, No. 19, Sep. 16, 2004, 2 pages.

(Continued)

*Primary Examiner* — Lincoln Donovan
*Assistant Examiner* — William Hernandez
(74) *Attorney, Agent, or Firm* — Coats & Bennett, P.L.L.C.

(57) ABSTRACT

A multiple antenna system is described herein that mitigates the negative effects of mutually coupled antennas on the connected transmitters and/or receivers. The antenna system comprises a directional coupler and two or more antennas. The directional coupler comprises multiple communication ports that each connect to corresponding antenna ports. The connection ports each connect to a different transmitter, receiver, or transceiver. A transmission line connects each antenna port to an antenna. The lengths of the transmission lines and the coupling factor of the directional coupler are selected to decouple the communication ports of the directional coupler. More particularly, the coupling factor and the transmission line lengths are selected so that antenna crosstalk signals caused by mutual coupling between the antennas and the coupled signals produced by the directional coupler have the same magnitude but opposite phase at the communication ports of the directional coupler.

18 Claims, 10 Drawing Sheets

OTHER PUBLICATIONS

S. Dossche, J. Romeu, S. Blanch, "Decoupling and Decorrelation of Two Closely Spaced Monopoles for Optimum Mimo Capacity," in Proc 1st European Conf. Antennas and Propagation (EuCAP2006), Nice, France, Nov. 2006, 4 pages.

H.J. Chaloupka, X. Wang, and J.C. Coetzee, "Performance Enhancement of Smart Antennas with Reduced Element Spacing," in Proc. IEEE Wireless Communications and Networking Conf., New Orleans, LA, Mar. 2003, pp. 425-430.

* cited by examiner

ANTENNA MATCHING FOR MIMO TRANSCEIVERS

BACKGROUND

The present invention relates generally to MIMO transceivers, and more particularly to antenna matching for MIMO transceivers.

Wireless communication systems often use multiple antennas at the transmitter and receiver to improve communication performance. Such Multiple-Input, Multiple-Output (MIMO) systems offer significant increases in data throughput without increasing the bandwidth or transmit power requirements.

MIMO transmitter antennas experience crosstalk due to mutual coupling between the antennas when a signal transmitted by one antenna couples to, and is therefore received by, one or more of the other transmit antennas. Such crosstalk effectively couples the transmitters, which may cause various transmitter problems, e.g., back intermodulation interference at the transmitter output terminals, transmitter mismatch, efficiency loss, etc. Base station transmitters may reduce and/or eliminate the mutual coupling by physically separating the antennas to spatially isolate the antennas. However, some wireless devices cannot adequately spatially separate the antennas. For example, mobile devices typically do not have sufficient space to adequately separate the antennas. When the antennas cannot be sufficiently separated, other techniques should be used to decouple the transmitters.

SUMMARY

The present invention comprises an antenna system that decouples transmitters, receivers, and/or transceivers to mitigate the negative effects of mutually coupled antennas. Mutual coupling between the antennas causes crosstalk signals to be returned by the antennas back into a transmission or reception system. To mitigate the negative effects of these crosstalk signals, the present invention selects the lengths of transmission lines used to connect the antennas to the corresponding antenna ports of a directional coupler. The transmission line lengths are selected to control the phase of the crosstalk signals so that the crosstalk signals do not appear at the outputs of the transmitters or the inputs of the receivers connected to the communication ports of the directional coupler.

In one exemplary embodiment, the antenna system comprises a directional coupler and a plurality of antennas. The directional coupler comprises communication ports corresponding to respective antenna ports. Each communication port of the directional coupler may connect to a different transmitter, receiver, or transceiver. A different transmission line connects each antenna port of the directional coupler to a different antenna. The lengths of the transmission lines and the coupling factor of the directional coupler are selected to decouple the communication ports of the directional coupler. More particularly, the coupling factor and the transmission line lengths are selected so that antenna crosstalk signals caused by mutual coupling between the antennas and the coupled signals produced by the directional coupler have the same magnitude but opposite phase at the communication ports of the directional coupler. Further, the selected line lengths enable the directional coupler to effectively redirect the crosstalk signals so that the crosstalk signals are substantially in phase with the coupled signals produced by the directional coupler at the antenna ports of the directional coupler. In so doing, the present invention not only mitigates the crosstalk present at the communication ports of the directional coupler, it also increases the gain of the signals present at the antenna ports of the directional coupler.

In one embodiment, the communication ports of the directional coupler connect to respective transmitters. For this embodiment, the lengths of the transmission lines are selected to decouple the transmitters such that antenna crosstalk signals received by the antennas during signal transmission and the coupled signals produced by the directional coupler at the outputs of the transmitters (i.e., the communication ports) have the opposite phase. Further, the selected line lengths enable the directional coupler to effectively redirect the crosstalk such that the crosstalk signals are in phase at the antenna ports of the directional coupler with the coupled signals produced by the directional coupler. In so doing, the present invention not only decouples the transmitters, it also increases the gain of the transmitted signals. Because of reciprocity, it will be appreciated that the same benefits occur when a plurality of receivers are connected to the communication ports of the directional coupler.

DETAILED DESCRIPTION

Figure 1:
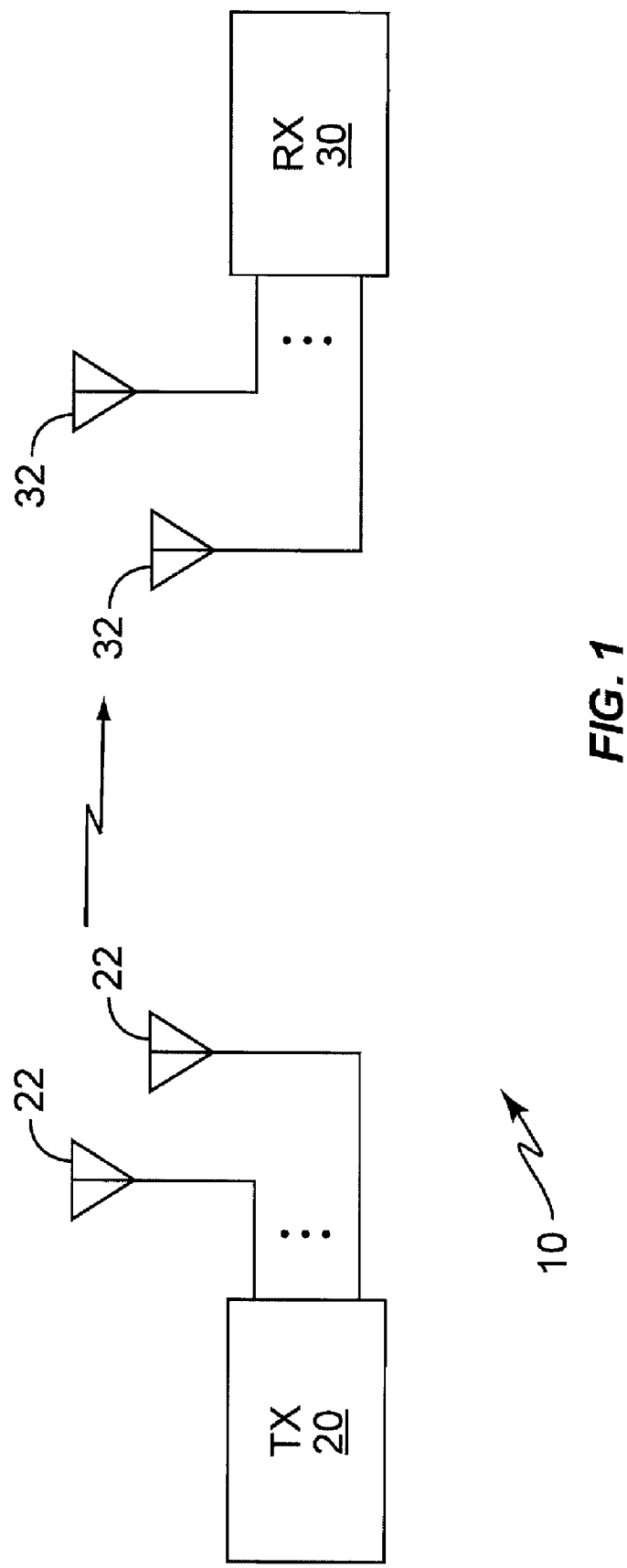
FIG. 1 shows a MIMO communication system.

As technological progress allows easier integration of electronic circuits into integrated chips, it becomes possible to conceive of consumer products, such as mobile phones or other portable wireless communication devices containing greater complexity and functionality while maintaining an economic product cost. MIMO systems provide one way to exploit such increases in complexity. MIMO systems use a multiplicity of antennas with associated transmitters, receivers, and signal processors to allow several parallel data streams to flow between devices on the same radio frequency. FIG. 1 shows an exemplary MIMO wireless communication system 10 comprising a multiple antenna transmission system 20 that transmits signals via antennas 22 to a multiple antenna receiver system 30. The multiple antenna receiver system 30 receives the transmitted signals at antennas 32. The diversity provided by MIMO system 10 provides significant increases in data throughput and link range without necessarily requiring additional bandwidth or transmission power.

Figure 2:
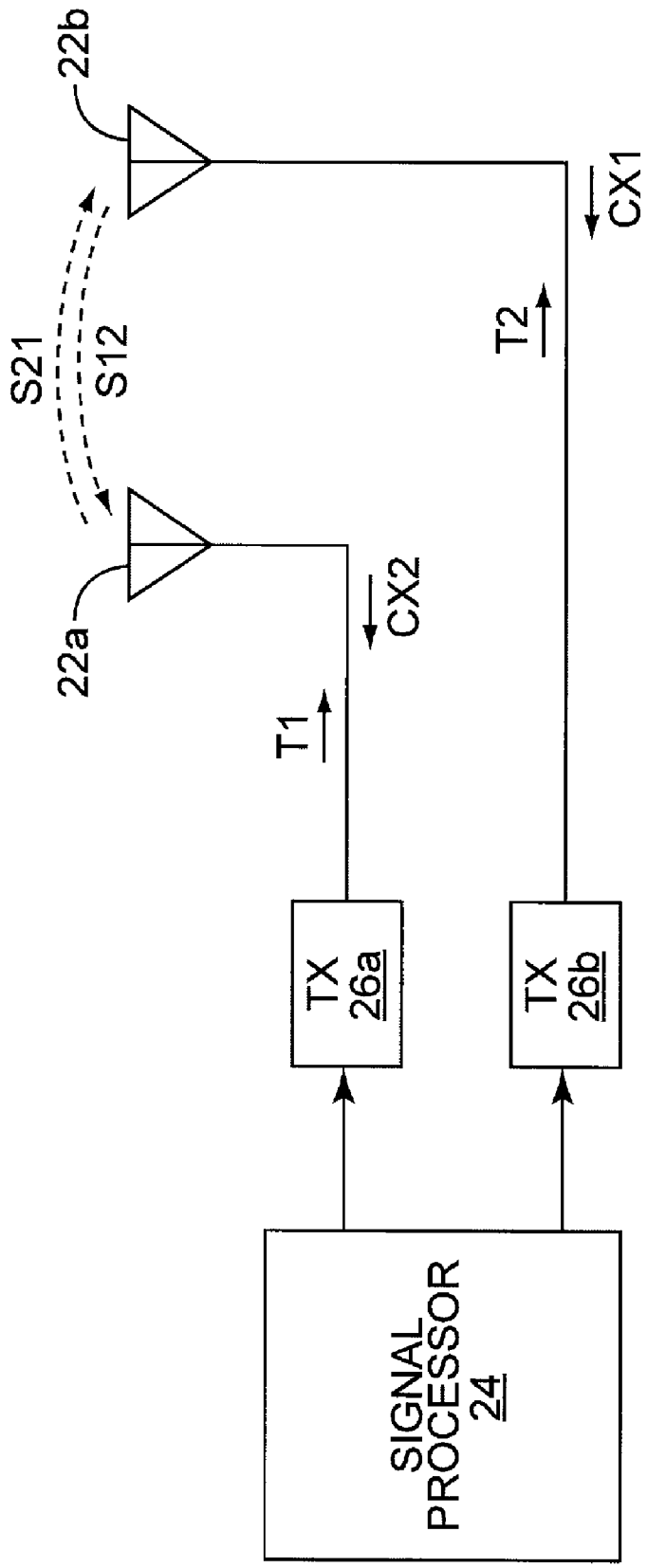
FIG. 2 shows a wireless communication device with a conventional two-antenna transmission system.

FIG. 2 shows a block diagram for wireless transmission system 20. Transmission system 20 includes signal processor 24 and two transmitters 26a, 26b connected to respective antennas 22a, 22b. Signal processor 24 generates modulated signals for the transmitters 26a, 26b. Transmitters 26a, 26b amplify the modulated signals for transmission via antennas 22a, 22b.

When transmission system 20 is part of a portable device, the close proximity of antennas 22 may cause mutual coupling between the antennas 22. Mutual coupling causes crosstalk between the antennas 22, where a portion of signals transmitted by one antenna is received by the other antenna. For example, antenna 22a may receive a portion CX2 of the signal T2 radiated by antenna 22b, and antenna 22b may receive a portion CX1 of the signal T1 radiated by antenna 22a. Antenna scattering parameters (e.g., s12, s21) define the amount of mutual coupling between the antennas 22, and therefore, the amplitude of the crosstalk signals CX1, CX2.

The crosstalk signals CX1, CX2 propagate from the antennas 22a, 22b to the transmitters 26a, 26b, respectively, and interact with the transmitter output signals, producing distortion products known as "back intermodulation." Back intermodulation causes out-of-band spectral energy and distorts the desired radiation, which causes decoding difficulties at the receiver. Because the amplitude of the crosstalk signals CX1, CX2 may be as much as 25% of the original transmission signal power amplitude (or 50% of the original transmission signal voltage amplitude), back intermodulation caused by such crosstalk signals may significantly degrade the performance of the transmitters 26a, 26b.

Figure 3:
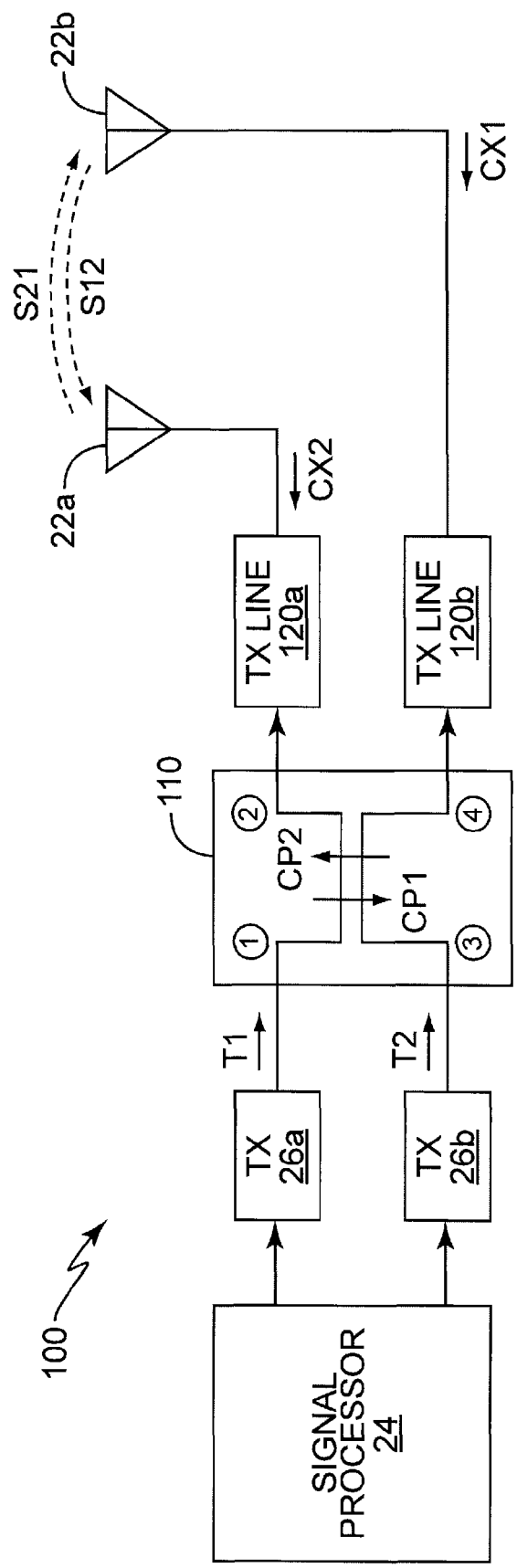
FIG. 3 shows a wireless communication device with a two-antenna transmission system according to one embodiment of the present invention.

FIG. 3 shows one exemplary antenna system 100 for a wireless communication device (not shown) that mitigates the effects of the antenna crosstalk signals, according to one embodiment of the present invention. While the following describes the antenna system as part of a transmission system, it will be appreciated that the antenna system 100 of the present invention also may be used with receiver and transceiver systems. Antenna system 100 comprises a directional coupler 110 disposed between the transmitters 26a, 26b and the antennas 22a, 22b to mitigate the effects of the crosstalk signals at the transmitter outputs. More particularly, the directional coupler 110 and the transmission lines 120a, 120b connecting the directional coupler 110 to the antennas 22a, 22b have a coupling factor and lengths, respectively, selected to substantially prevent the crosstalk signals from appearing at the transmitter outputs.

As shown in FIG. 3, the transmitters 26a, 26b connect to communication port 1 and communication port 3, respectively, of the directional coupler 110, while the antenna ports 2 and 4 of directional coupler 110 connect to the antennas 22a, 22b via the transmission lines 120a, 120b, respectively. Directional coupler 110 comprises conductive traces that directly connect communication port 1 to antenna port 2, and communication port 3 to antenna port 4. For example, the conductive traces of the directional coupler 110 pass the signal T1 output by transmitter 26a to antenna port 2, and pass the signal T2 output by transmitter 26b to antenna port 4. Further, due to the close proximity of the conductive traces, a portion CP1 of T1 couples to communication port 3 and a portion CP2 of T2 couples to communication port 1. Thus, in addition to the crosstalk signals CX1, CX2, the transmitters 26a, 26b also see the coupled signals CP1, CP2 produced by directional coupler 110.

To mitigate the effects of both the crosstalk signals CX1, CX2 and the coupled signals CP1, CP2 on the transmitters 26a, 26b, the coupling factor of the directional coupler 110 and the lengths of the transmission lines 120a, 120b are selected such that the antenna crosstalk signals CX1, CX2 and the respective coupled signals CP1, CP2 have substantially the same magnitude but opposite phase at the respective communication ports 3 and 1 of the directional coupler 110. By selecting the coupling factor for the directional coupler 110 to equal the mutual coupling between the antennas 22a, 22b, the crosstalk signals and the coupled signals have the same magnitude at communication ports 1 and 3 of the directional coupler 110. The lengths of the transmission lines 120a, 120b are selected so that the coupled signals CP1, CP2 and crosstalk signals CX1, CX2 have opposite phase at communication ports 1 and 3. For example, proper selection of the coupling factor and transmission line lengths causes CP2=−CX2 at port 1 of the directional coupler 110 and CP1=−CX1 at port 3 of the directional coupler 110. As a result, the coupled and crosstalk signals combine at the communication ports of the directional coupler 110 to effectively decouple the communication ports of the directional coupler 110, and therefore transmitters 26a, 26b, despite the mutual coupling between antennas 22a, 22b.

The directional coupler 110 may comprise any type of directional coupler and is substantially lossless, i.e., either the loss associated with the directional coupler 110 is zero or negligible. Thus, the crosstalk signals and coupled signals do not dissipate in the directional coupler 110. Instead, the directional coupler 110 redirects the coupled and crosstalk signals away from the communication ports and towards the antenna ports in a manner that increases the radiation of the desired signal. More particularly, the directional coupler 110 passes CP1 from communication port 3 to antenna port 4, and couples CX2 from antenna port 2 to antenna port 4. Further, the directional coupler 110 passes CP2 from communication port 1 to antenna port 2, and couples CX1 from antenna port 4 to antenna port 2. Because the crosstalk and coupled signals are not out of phase at the antenna ports, they do not cancel. As a result, the crosstalk signals effectively boost the power of the transmission signals passed by the directional coupler 110. Due to reciprocity, these same decoupling and gain benefits also occur for receivers and/or transceivers connected to ports 1 and 3 of the directional coupler 110.

Before describing the details of the present invention, the following first provides some background details for the MIMO system 10 of FIG. 1. The propagation paths between each antenna 22 of a multi-antenna transmission system 20 and each antenna 32 of a multi-antenna reception system 30 form a matrix C of paths, where each element $C_{ij}$ of the matrix describes the characteristics of the propagation path or channel between transmitting antenna j and receiving antenna i. In free space, the matrix has a rank of unity when only one polarization is considered, or a rank of two when both polarizations are considered, allowing one (single polarization) or two (dual polarization) independent information streams to be communicated between the transmitting system and the receiving system. In a highly dispersive propagation environment however, the paths described by the matrix elements become less and less correlated, which can result in the matrix having a rank greater than 2.

MIMO systems typically include enough antennas 22, 32 at the transmitter 20 and receiver 30 so as to not be the limitation on matrix rank. As discussed above, MIMO systems transmit a greater number of independent information streams at the same time, thus increasing the aggregate information rate.

Any matrix C can be decomposed into the form $C=\Omega \Lambda \Omega^{-1}$, where $\Omega$ is a matrix of the eigenvectors of C, and $\Lambda$ is a diagonal matrix of the eigenvalues. If a vector (T) of signals to be transmitted is pre-multiplied by $\Omega$ before transmission via the multiple antennas 22, and the vector of received signals is multiplied by $\Omega^{-1}$ to get a received signal vector (R), then we have $R=\Omega^{-1}\Omega>\Lambda\Omega^{-1}T$, giving $R=\Lambda T$. Because $\Lambda$ is diagonal, we have $R_1=\lambda_1 T_1$, $R_2=\lambda_2 T_2$, ..., $R_n=\lambda_n T_n$, showing that n independent transmitter-to-receiver paths exist. The act of pre-multiplying the transmit signal vector T by $\Omega$ at the transmitter can be said to have created for each transmitted signal $T_i$ an "eigenmode" of radiated signals. Likewise, the act of multiplying the received signal vector R by resolves the received signals into eigenmodes, and therefore separates or decouples the different transmitted streams from one another.

The information rates that may be supported by the different eigenmodes are not necessarily the same, but depend on the magnitude of the eigenvalue $\lambda_i$, which gives the propagation attenuation for eigenmode (i). If the eignevalue is zero, the corresponding mode does not support a transmission, and the channel matrix rank is less than n.

U.S. Pat. No. 7,120,199 to Thielecke et al. describes a MIMO system in which the receiver informs the transmitter by feedback of the number of non-zero modes and their respective capacities for information transmission that the channel matrix will instantaneously support, and the transmitter adapts to changes in the various propagation paths $C_{ij}$ to do the best it can.

Note that for the MIMO system 10 that uses the transmission system 20 of FIG. 2 and a corresponding reception system, the matrix $C_{ij}$ is the matrix of propagation channels between the transmit antennas 22 and the receive antennas 32, and is not related to the impedance, admittance, or scattering matrix (n-port circuit matrix) that describes a set of transmitting antennas 22 or a set of receiving antennas 32. It is generally assumed in conventional MIMO systems that the Radio Engineer will somehow contrive to provide n transmitting antennas 22 or n receiving antennas 32 that are effectively uncoupled from and thus independent of each other, e.g., that the n-port circuit matrix describing the multi-antenna system is diagonal. Unfortunately this is not likely to be the case when multiple antennas are located very close together, e.g., in a small device such as a mobile phone. If ignored, mutual coupling between the transmit antennas 22 can cause problems such as back-intermodulation between eigenmode signals at the transmitter output terminals or transmitter mismatch, which causes a loss of efficiency. The present invention provides a solution that improves the multi-antenna systems with the aim of reducing such undesirable effects.

It is difficult to accommodate multiple antennas on a portable wireless communication device, so the first MIMO products may be limited to two, or at most 4 antennas. The simplest example of the invention is a mobile phone using two antennas. In the case of two antennas, they may be identical or orthogonally polarized. Orthogonally polarized antennas could in principle have low coupling from one to the other. The invention is more beneficial, however, in the case where the antennas are strongly coupled, as when they have identical polarization. In the four antenna case, a good solution is to use two pairs of antennas, each pair being of identical antennas while one pair uses the orthogonal polarization relative to the other. The present invention is then beneficially used to account for the coupling within each pair. The following initially describes the present invention in terms of a simple pair of identical transmit antennas 22.

Figure 4:
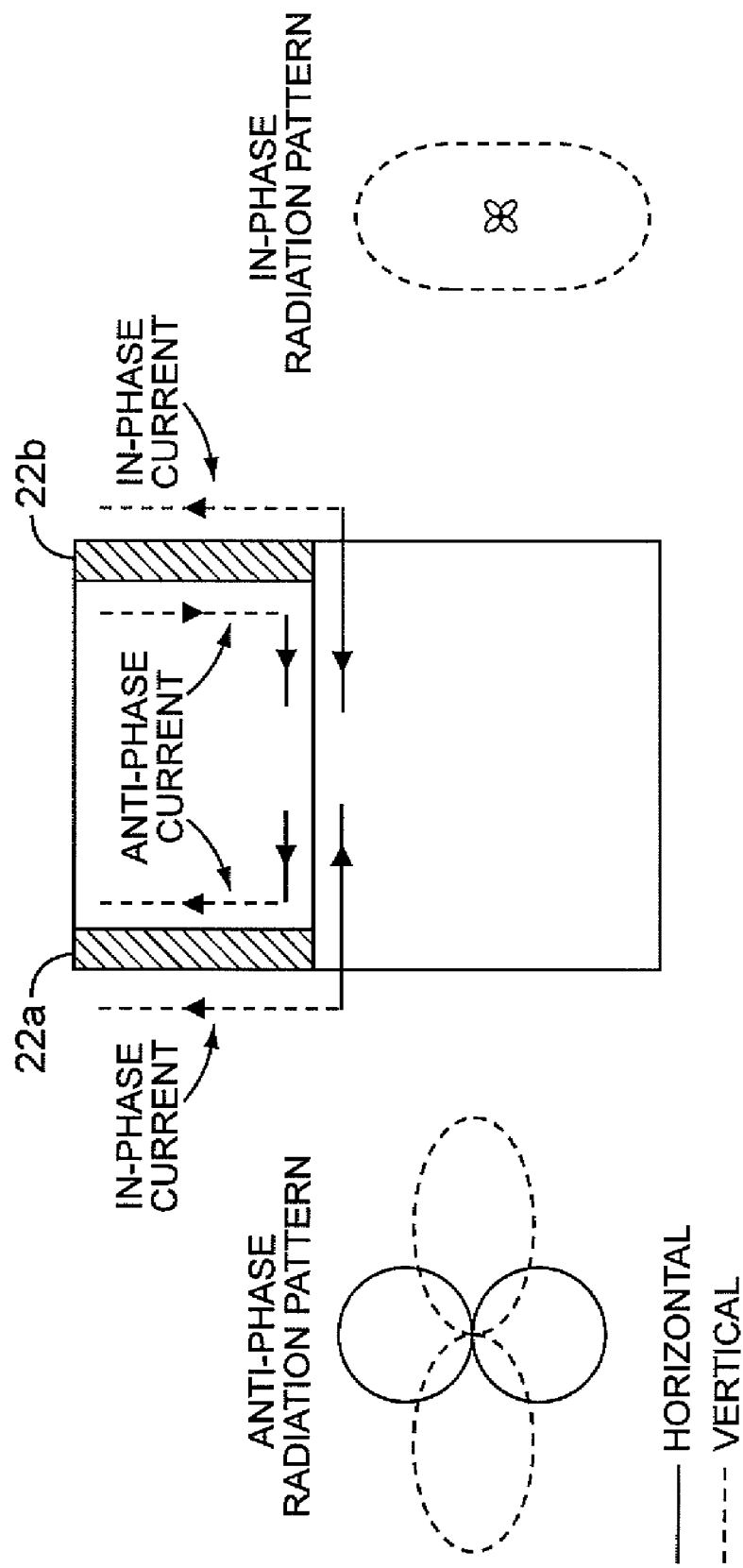
FIG. 4 shows an exemplary arrangement for a pair of antennas in a communication device.

FIG. 4 illustrates how a pair of identical antennas 22 may be arranged on a portable device. The antennas 22 are placed as far apart as physically possible, one on one side of the device and the other on the other side. Mirror symmetry is the inevitable result. Without mirror symmetry, the antennas 22 would not have identical electrical characteristics. FIG. 4 also illustrates how a pair of nominally vertically polarized end-fed antennas 22 can create significant horizontally polarized components. That means that the pair of antennas 22 can couple to other antennas which may be disposed on the handheld device that are horizontally polarized. This makes it difficult to place even a single pair of antennas 22 on a handheld device without incurring some mutual coupling between the antennas 22. The anti-phase radiation patterns are for driving the two antennas 22 out of phase. As the current flow arrows show, anti-phase drive has a high horizontal current flow component because the horizontal current arrows point in the same direction for both antennas. For the in-phase radiation, the horizontal current flows in opposite directions. Thus, there is not much horizontally polarized radiation. Instead, the in-phase drive has a high vertical component. While FIG. 4 generally describes an antenna system having mirror symmetry, one skilled in the art will appreciate that the present invention described herein also applies to arbitrary antenna configurations.

Figure 5:
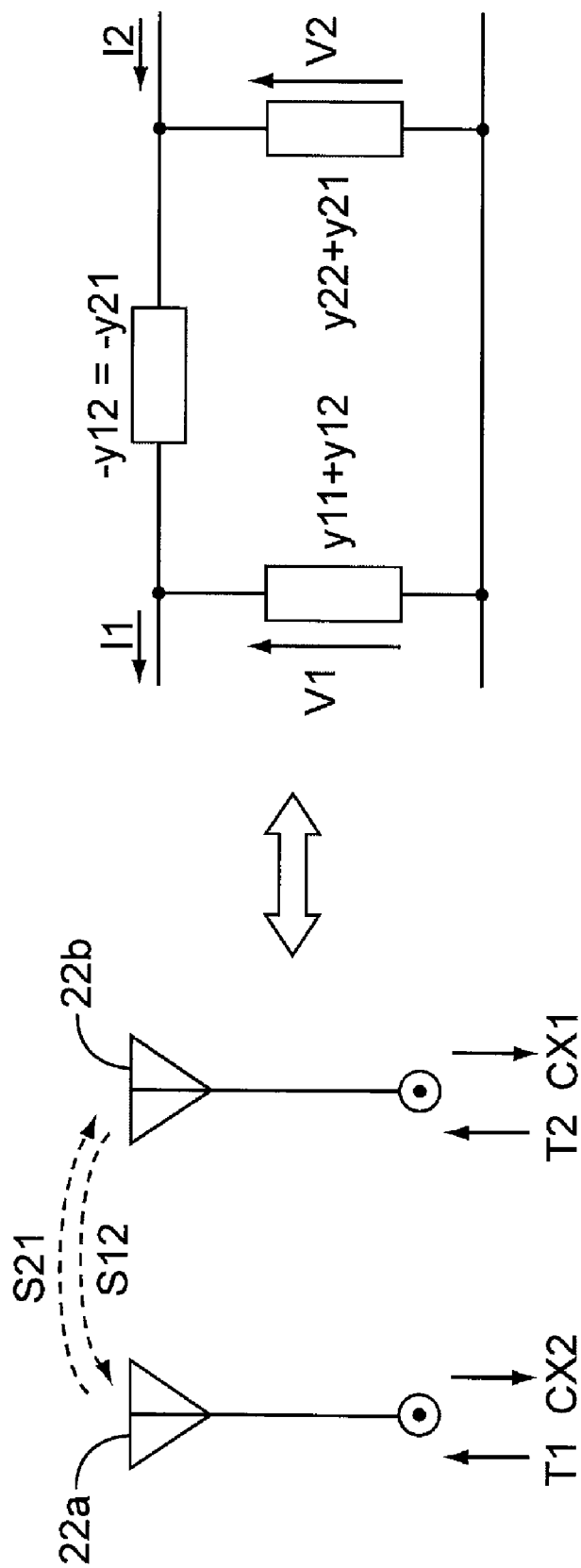
FIG. 5 shows an exemplary circuit representation for a pair of mutually coupled antennas.

FIG. 5 illustrates an electrical circuit representation of the pair of antennas 22. One circuit matrix representation that may be used is the scattering matrix. A scattering matrix relates wave amplitudes emerging from a multi-port network to wave amplitudes incident upon the network. An incident wave is distinguished from an emergent wave by its direction of propagation. Separating two waves propagating in different directions on the same wire requires examination of the relationships of both voltage and current. It is not possible to distinguish the two directions by just measuring the voltage amplitude at one point on a wire, nor is it possible to distinguish direction by looking only at the direction of current flow, as the current is alternating current. Instead, a forward wave is defined as a combination of voltage plus current while a reverse wave is defined as a combination of voltage minus current. To allow a combination of voltage and current, which have different units, their units are reconciled by dividing the voltage by the square root of an impedance Ro and multiplying current by the square root of Ro, both of which then have the dimensions of the square root of power. The result is that the forward wave amplitude is represented by $$f = \frac{V}{\sqrt{Ro}} + I\sqrt{Ro},$$

and that the reverse wave amplitude is represented by $$r = \frac{V}{\sqrt{Ro}} - I\sqrt{Ro}.$$

The definition of forward and reverse propagating waves depends on agreeing on the reference impedance Ro. Thus, the scattering matrix parameters also depend on the reference impedance Ro.

For a 2-port system, Equation (1) relates the reverse propagating waves r1 and r2 emergent from the two ports to the forward waves f1, f2 incident on the two ports.

$$\begin{bmatrix} r1 \\ r2 \end{bmatrix} = \begin{bmatrix} s11 & s12 \\ s21 & s22 \end{bmatrix} \begin{bmatrix} f1 \\ f2 \end{bmatrix} \qquad (1)$$

In Equation (1), s11 represents the input reflection coefficient relative to the reference impedance Ro, s22 represents the output reflection coefficient, s21 represents the forward scattering parameter, and s12 represents the reverse scattering parameter. If port 2 is terminated in a load impedance equal to Ro, the emergent wave r2 will dissipate in that load and none will be returned to the network, i.e., f2 will be zero. The reverse wave at port 1 will then be r1=s11·f1, so the input reflection coefficient is s11=r1/f1. It is convenient to assume that the antennas 22 of the pair have been so designed and adjusted that each antenna 22 is matched, and therefore has a zero reflection coefficient when a dummy load of Ro is connected to the other. In that case, from the above, s11 is zero. The scattering matrix for such a pair of antennas 22 is thus given by:

$$\begin{bmatrix} 0 & s12 \\ s12 & 0 \end{bmatrix}, \quad (2)$$

where s12=s21 due to symmetry. While the above describes the circuit matrix representation in terms of a scattering matrix, it will be appreciated that other representations may also be used, such as the impedance or admittance matrix representation given by:

$$\begin{bmatrix} I1 \\ I2 \end{bmatrix} = \begin{bmatrix} y11 & y12 \\ y21 & y22 \end{bmatrix} \begin{bmatrix} f1 \\ f2 \end{bmatrix} \quad (3)$$

For the MIMO antenna system 100 of the present invention (e.g., FIG. 3), the signal processing circuits 24 generate modulating signals for the two transmitters 26a, 26b, where the transmitters 26a, 26b transmit their respective output signals using respective antennas 22a, 22b. If the antennas 22a, 22b have the above scattering matrix with zero s11 and s22 but non-zero s12 and s21, then one transmitter 26a will see a proportion CX2 of the signal T2 output by the other transmitter 26b being reflected back to it. As noted above, this proportion may be as much as 25% of the output power of transmitter 26b (50% in voltage amplitude), which corresponds to an s12 magnitude of −6 dB. Such crosstalk CX2 interacts with the signal T1 output by transmitter 26a back intermodulation. The present invention therefore seeks to mitigate the coupling between the transmitters 26a, 26b caused by the mutual coupling of the antennas 22a, 22b by reducing the effects of s12 on the transmitters 22a, 22b.

Figure 6:
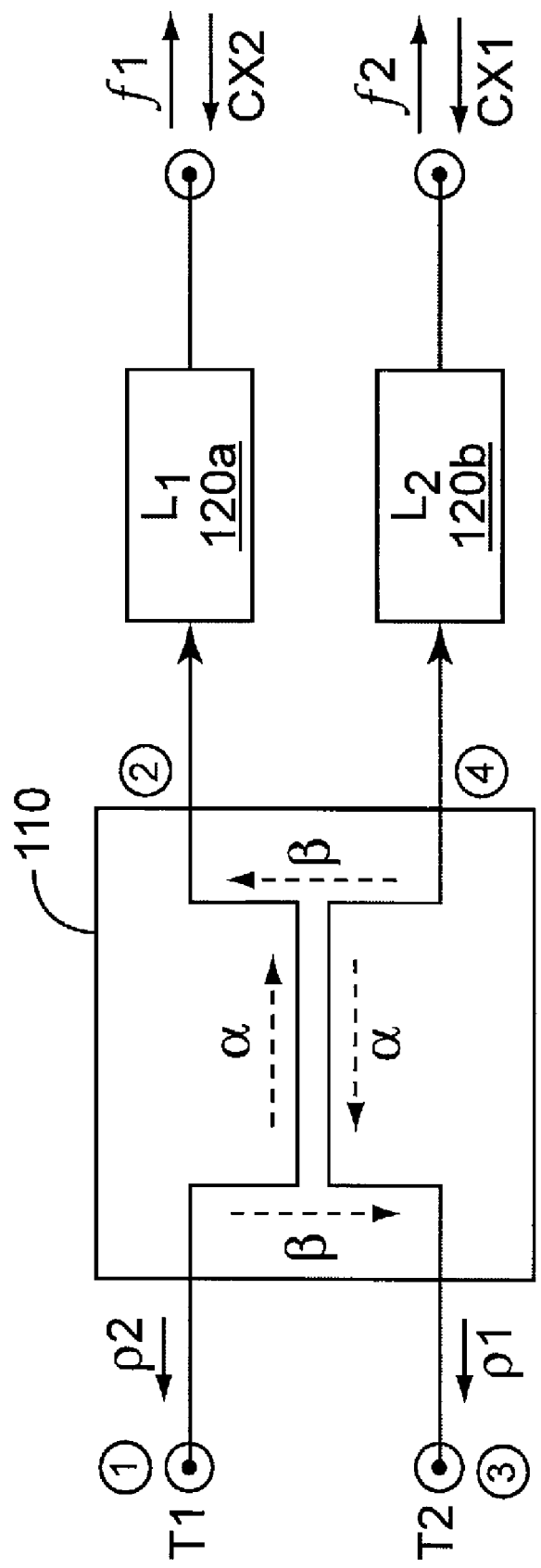
FIG. 6 shows an exemplary directional coupler for a two-antenna transmission system.

FIG. 6 shows details of the directional coupler 110 and transmission lines 120a, 120b in the antenna system 100 of the present invention. Directional coupler 110 has the same characteristic impedance to which the antennas 22a, 22b and transmitters 26a, 26b are matched. For example, the characteristic impedance of the directional coupler 110 may be the common standard value of 50 ohms. Directional coupler 110 has four ports. When connected to transmitters 26a, 26b, communication ports 1 and 3 comprise transmitter ports. The coupling from port 1 to port 2 is represented by a complex factor α, which equates to a forward scattering parameter like s21. The coupling from port 3 to port 4 is also α. Because the coupler 110 is reciprocal, the coupling from port 2 to port 1, and the coupling from port 4 to port 3 is also α. On the other hand, the coupling from port 1 to port 3 is represented by a complex factor β, as are the couplings from port 3 to port 1, port 2 to port 4, and port 4 to port 2. With a well designed directional coupler, the cross-couplings, e.g., from port 1 to port 4, from port 4 to port 1, from port 2 to port 3, and from port 3 to port 2, are zero. Thus, ports 1 and 4 are commonly referred to as "isolated" ports. Further, ports 2 and 3 are also isolated ports.

Transmission lines 120a, 120b have a physical length L. This physical length results in an electrical length or phase shift of $\theta=2\pi L/\lambda$ radians. Thus, a wave propagating through one of the transmission lines is multiplied by the complex phase delay factor $e^{-j\theta}$. T1 and T2 represent the waves respectively output by transmitter 26a and transmitter 26b, and applied to ports 1 and 3, respectively, of the directional coupler 110. The wave amplitudes emerging from transmission lines 120a, 120b, which are incident upon the antennas 22a, 22b are represented by f1 and f2, respectively. The wave amplitudes propagating from the antennas 22a, 22b due to the mutual coupling between the antennas are represented by crosstalk signals CX2 and CX1, respectively. To prevent back intermodulation at transmitter 26a, the goal is to make the wave amplitude arriving back at transmitter 26a due to T2 from transmitter 26b to be zero, i.e., ρ2=0. Similarly, to prevent back intermodulation at transmitter 26b, the goal is to make the wave amplitude arriving back at transmitter 26b due to T1 from transmitter 26a to be zero, i.e., ρ1=0.

By analyzing wave propagation in FIG. 6, the following equations may be deduced.

$$f1 = e^{-j\theta}(\alpha T1 + \beta e^{-j\theta} CX2) \quad (1)$$

$$CX2 = s12 \cdot f1 \quad (2)$$

$$\rho2 = \beta T1 + \alpha e^{-j\theta} CX2 \quad (3)$$

Eliminating f1 between equations 1 and 2, obtaining r2 in terms of T1, and substituting in Equation (3) gives:

$$\rho2 = \frac{T1\left(\alpha^2 - \beta^2 + \frac{\beta}{s12'}\right)}{\frac{1}{s12'} - \beta}, \quad (4)$$

where $s12'=s12 e^{-j2\theta}$. When the directional coupler 110 is a quadrature coupler, meaning that there is a 90-degree phase difference between the α and β coupling factors, the forward coupling factor α has a 90 degree phase lag, and the reverse coupling factor β is in phase. Thus, α has of the form −jk and β has the form $\sqrt{1-k^2}$, which results in $\alpha^2=\beta^2-1$. Substituting $\alpha^2=\beta^2-1$ into Equation (4) produces:

$$\rho2 = \frac{T1\left(\frac{\beta}{s12'} - 1\right)}{\frac{1}{s12'} - \beta}, \quad (5)$$

which is zero when $\beta=\sqrt{1-k^2}=s12'$.

Because β is real and positive, the line lengths L1 and L2 must be chosen to make s12' real and positive, which means $$\theta = N\pi - \frac{\angle(s12)}{2},$$

where N is any integer. N may be chosen so that the transmission lines 120a, 120b are physically long enough to reach from each antenna 22a, 22b to the directional coupler 110. It will be appreciated that the same logic applies to achieve ρ1=0 at port 3.

The arrangement just described has a number of benefits. First, ports 1 and 3 presented to the transmitters 26a, 26b are now decoupled from one another, preventing the back-intermodulation effect. Further, the design is simple. Design each antenna 22a, 22b to be matched to the desired standard impedance (e.g. 50Ω) when the other antenna is terminated in the standard impedance; measure the coupling s12 between the antennas 22a, 22b, connect the antennas 22a, 22b to the transmitters 26a, 26b through a quadrature directional coupler 110 with that same coupling factor and transmission lines 120a, 120b; and use appropriate line lengths to give antiphase coupling at ports 1 and 3. Another benefit is that the directional coupler 110 and transmission lines 120a, 120b are lossless (e.g., either zero loss or negligible loss), so all or almost all power output by the transmitters 26a, 26b is radiated by the antennas 22a, 22b.

Because the directional coupler 110 and transmission lines 120a, 120b are substantially lossless, the power that would have been absorbed in the termination of the second antenna 22b, had the invention not been used, is instead returned by the directional coupler 110 to the first antenna 22a and usefully radiated (and vice versa). This benefit arises because the directional coupler 110 in fact exhibits a gain, inasmuch as the forward power f1 applied to antenna 22a due to the transmitter 26a is greater than the power output from transmitter 26a by the factor $1+|s12|^2$. This gain does not violate conservation of energy because the gain is due to the power coupled from antenna 22a to antenna 22b, which, when using the invention, is re-circulated to antenna 22a through the coupler 110. This gain will be measured in reality when using the invention when compared to not using the invention and tolerating transmitter coupling. For example, when $|s12|=-10$ dB, the gain is 0.5 dB; when $|s12|=-6$ dB, the gain is 1 dB.

In addition, a matched, directional coupler 110 is very small and simple to construct when reasonably low bandwidths are required. The total bandwidth of a wireless communication device including the transmit band and the receive band is sufficiently low in this context, being only in the range of 10-15% of the center frequency. For example, a directional coupler 110 may be constructed using a short length of twisted wire and two capacitors. Further, using printed strip line transmission lines provides manufacturing repeatability of the line-length matching.

Figure 7:
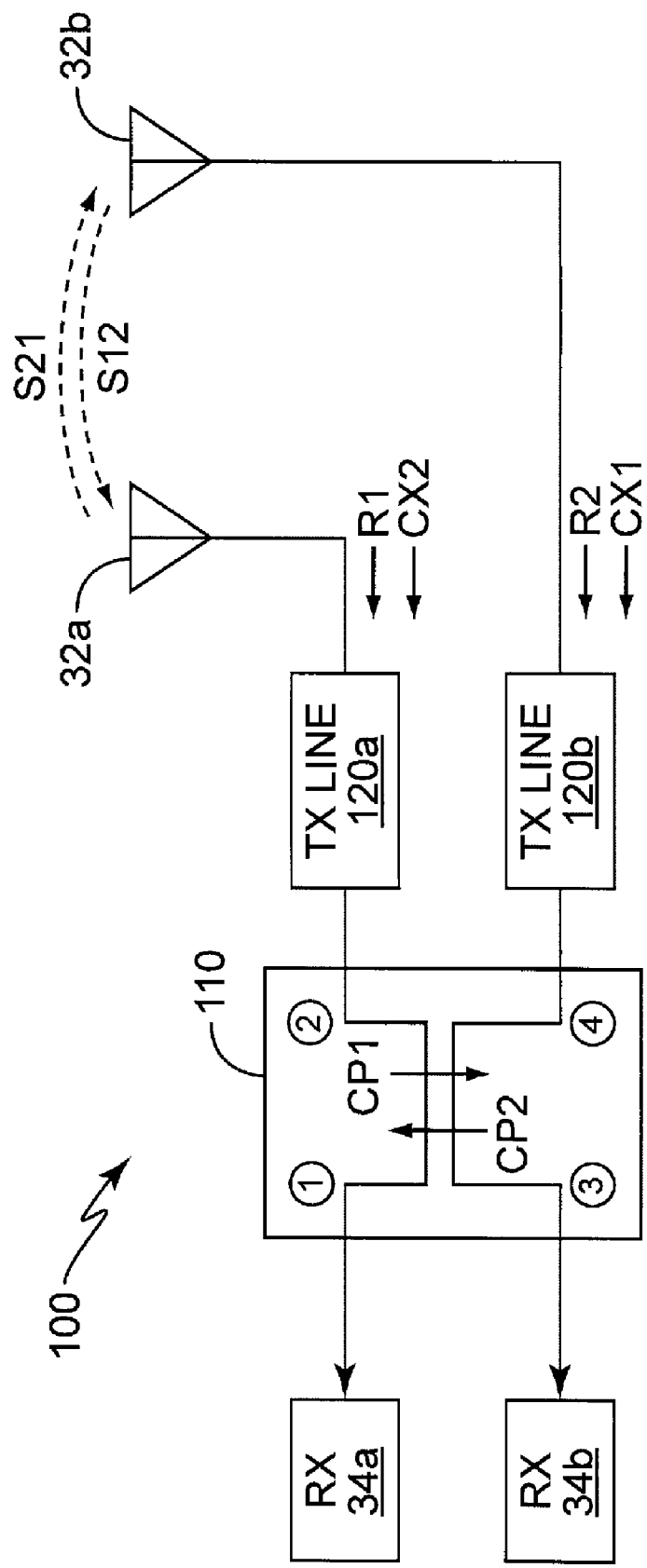
FIG. 7 shows a wireless communication device with a two-antenna reception system according to one embodiment of the present invention.

Another benefit is achieved when receivers 34a, 34b are connected to ports 1 and 3 of antenna system 100, as shown in FIG. 7. Using reciprocity arguments, the same gain as measured for transmission will be measured for reception, e.g., the signal in one receiver 34a will be greater than the signal would have been without the invention. The gain is due to the recovery of the energy that would have been delivered to the other receiver 34b. This signal would not normally have been recovered, except by combining the receiver outputs with a particular phase and weighting, which may not have been the phase and weighting that the MIMO processing would have used.

To understand the reciprocity of the present invention as it applies to receivers, consider the following. In the absence of the invention, a signal impinging on antennas 32a, 32b will be received partly by one receiver 34a and partly by the other receiver 34b. Assuming the receivers 34a, 34b represent perfectly matched loads, the receivers 34a, 34b do not reflect any signals back towards the antennas 32a, 32b. However, if one receiver 34a is disconnected from its antenna 32a, the signal intended for this receiver 34a will be reflected back towards its antenna 32a and will be re-radiated. The re-radiated signal will then be received at the other receiver 34b by virtue of the antenna mutual coupling. The phase of the back-coupled signal will depend on line lengths and may be in-phase or out-of-phase with the desired signal, thereby potentially altering it. Moreover, not all of the re-radiated signal is received by the second receiver 34b; most of the re-radiated signal is radiated into space, and is therefore lost. Thus, it is clear that in conventional multiple antenna receiver systems, one receiver 34a is sensitive to the presence or absence of another receiver 34b.

When using the present invention, however, the mutual coupling between the antennas 32a, 32b is cancelled at the receivers 34a, 34b, such that one receiver 34a is no longer affected by the existence of another receiver 34b, and each receiver 34a, 34b receives a determined proportion of signals incident on the antenna system 100, irrespective of the other receivers 34a, 34b. It is also true that the present invention prevents any noise generated by one receiver 34a at its input from reaching another receiver 34, which would otherwise have added to the other receiver's noise level. It will be appreciated that the isolation between receivers 34a, 34b is a property that exists at the directional coupler ports to which the receivers 34a, 34b are connected. Thus, the above transmitter analysis also applies to receivers and transceivers connected to ports 1 and 3 of the directional coupler 110.

Figure 8A:
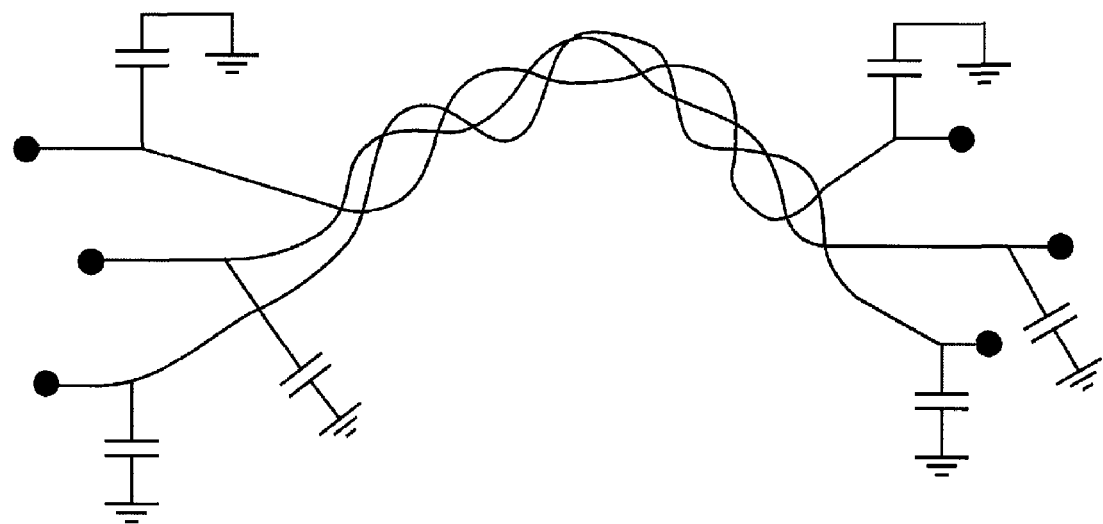
FIGS. 8A and 8B show an exemplary directional coupler for a three-antenna transmission system.

The present invention is not limited to the two-antenna solution discussed above, and may be applied to a multiple antenna system 100 having any number of antennas. For example, the present invention applies to a three antenna system. In one embodiment, a circularly symmetrical case has three identical antennas disposed at 120° intervals around a circularly symmetric device. The circular symmetry of this arrangement is evident in its scattering matrix $$\begin{bmatrix} s11 & s12 & s12 \\ s12 & s11 & s12 \\ s12 & s12 & s11 \end{bmatrix}, \quad (9)$$

which shows that all off-diagonal inter-antenna couplings are the same and equal to s12. An implementation of the invention in this case may design each antenna to be matched to the standard impedance Ro when the other two are terminated in Ro. This makes s11 zero in the scattering matrix. Next, a 3-communication port, 3-antenna port directional coupler, depicted in FIG. 8A, is used. The 3-port directional coupler 110 has coupling from one line to either of the other two lines equal in magnitude to s12. FIG. 8A shows a simple implementation of such a three antenna coupler 110, which is very small for typical cell phone frequency bands, comprising a few millimeters of trifilar twisted wire with capacitances at the ends.

In some cases, the three-antenna system is not circularly symmetrical, but has different coupling between different pairs of antennas 22 given by the scattering matrix:

$$\begin{bmatrix} 0 & s12 & s13 \\ s12 & 0 & s23 \\ s13 & s23 & 0 \end{bmatrix}. \quad (10)$$

Figure 8B:
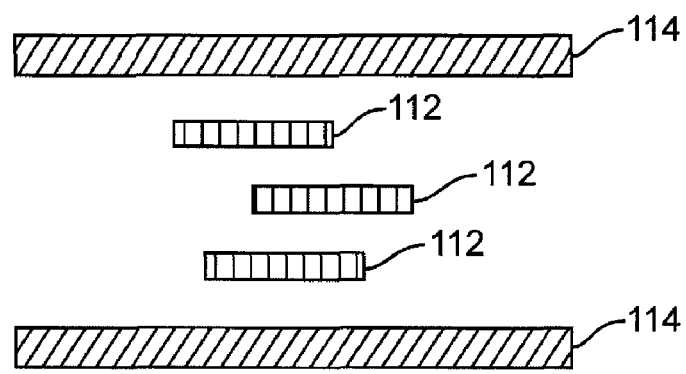

This scattering matrix assumes that the antennas 22 are each matched to Ro when the other two are terminated in Ro, making $s11=s22=s33=0$. This assumption requires the construction of a 3-port coupler 110 having correspondingly unequal couplings in order to annul the three mutual couplings s12, s13, and s23. FIG. 8B shows the cross-section of such a coupler 110 as a multi-layer strip line construction that realizes unequal couplings by choosing the appropriate overlap between the layers. The asymmetrical coupler of FIG. 8B comprises three asymmetrically placed coupled lines 112 disposed between two ground planes 114. In the asymmetrical case, the phases of s12, s13, and s23 may be different. Nevertheless it is always possible to choose three lines of electrical lengths 120 to connect the antennas to the coupler to modify the phases of s12, s13, and s23 to all be a multiple of 2π.

Figure 9B:
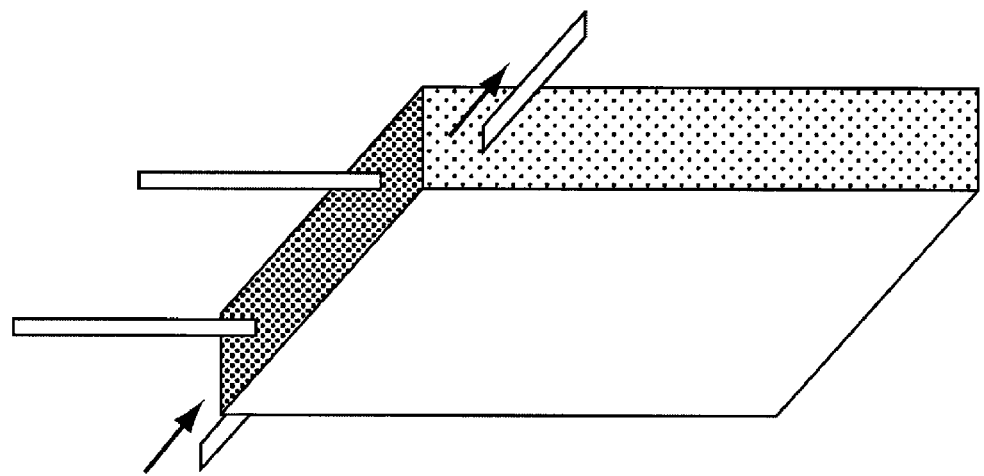
FIGS. 9A and 9B show exemplary antenna configurations for a four-antenna transmission system.
Figure 9A:
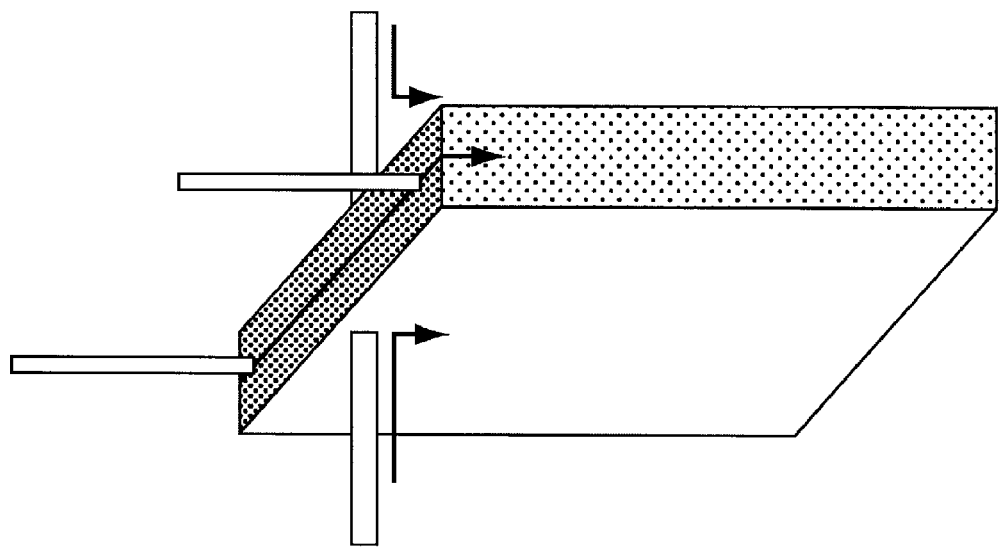

In another exemplary embodiment, the present invention may be applied to a four antenna system. There are many possible arrangements of four antennas 22, two of which are shown in FIGS. 9A and 9B. FIG. 9A shows an antenna configuration comprising a pair of vertical stubs and a pair of horizontal stubs. The horizontal stubs attempt to form horizontally polarized radiation, while the vertical stubs attempt to form vertical polarized radiation. However, the return current for end-fed antennas 22 flows in the body of the device to which they are attached. It may be seen that the even mode (in-phase) current flow for the horizontally polarized antennas 22 is actually a net vertical current flow. Therefore the even mode of the horizontal pair of antennas 22 is coupled to the even mode of the vertical pair of antennas 22, but not to the odd mode of the vertical pair of antennas 22. The odd mode of the vertical pair of antennas 22 does not couple to the odd or even modes of the horizontal pair of antennas 22, as the two horizontal modes are at right angles to the current flow of the vertical odd mode. A mutual coupling mitigation solution for the antenna configuration of FIG. 9A may comprise a 2-antenna solution for each of the vertical pair and the horizontal pair, plus a 2-antenna solution for mitigating the remaining coupling between the even modes of the two pairs.

Figure 10:
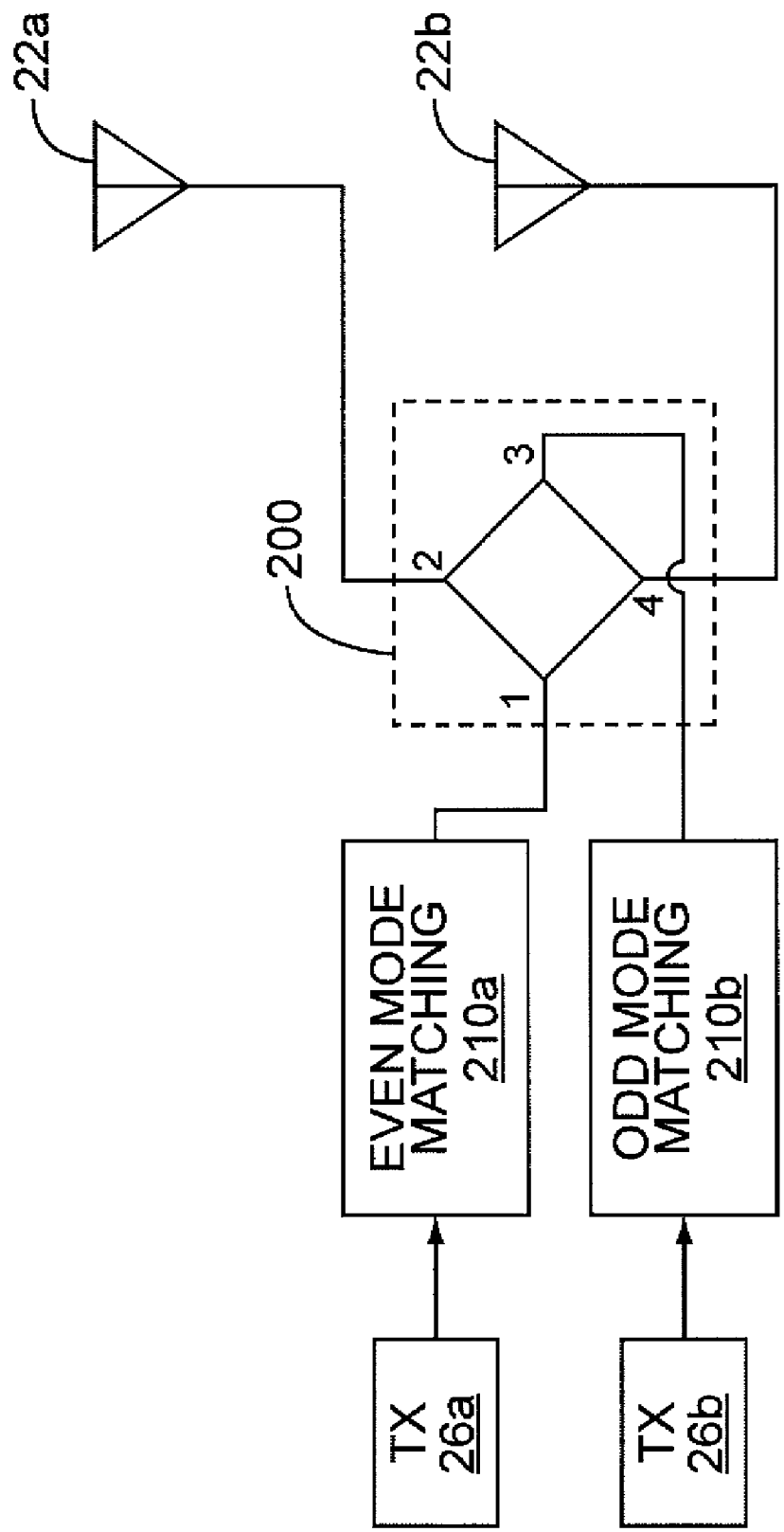
FIG. 10 shows an exemplary arrangement for a pair of antennas relative to even and odd mode radiation patterns.

FIG. 10 shows firstly how to create the even and odd modes of a pair of antennas 22. A 180-degree splitter 200 drives the antennas 22 in phase (the even mode) when fed by a transmitter 26a at port 1, and drives the antennas 22 out of phase (the odd mode) when fed by a transmitter 26b at port 3. The even and odd modes generally exhibit different impedances. Therefore, creating even and odd modes can also comprise using impedance matching networks 210a and 210b to match the impedance separately for each mode to a desired value, e.g., 50 ohms. When a pair of antennas is symmetrically disposed, the even and odd modes should already be uncoupled, but, as with the 4-antenna configuration under discussion, may couple to the even or odd modes of a different pair of antennas 22. If a first mode of a first pair of antennas 22 or antenna system couples to a second mode of a second pair of antennas 22 or antenna system, and it is desired to decouple them, a directional coupler 110 and suitably chosen transmission line lengths as shown in FIG. 3 may be used. The transmission lines 120a, 120b which, in FIG. 3 connect to antennas 22a and 22b, would now connect to the appropriate drive ports for the antenna modes, for example to the transmitter side of even-mode matching network 210a of FIG. 10, if that was the first mode of the first pair of antenna 22 and to a similar place in the second pair of antennas 22 for the second mode, which is to be decoupled form the first mode of the first pair of antennas 22.

FIG. 9B shows an alternative antenna orientation of the horizontal stubs. In this case, in addition to the even modes of the horizontal pair of antennas 22 and the vertical pair of antennas 22 being coupled by reason of return current flows in the device body, the odd mode of the vertical pair of antennas 22 is now seen to comprise a horizontally polarized current distribution which couples to the odd mode of the horizontal pair of antennas 22. The solution in this case can therefore be as described for the configuration of FIG. 9A, with the addition of a 2-antenna mutual coupling mitigation scheme to decouple the odd modes.

It remains to consider the arbitrary case of N antennas disposed with no particular symmetries. As was exemplified in the 3-antenna example, by connecting an appropriate line of electrical length to each antenna 22, at least N of the N(N−1)/2 off-diagonal scattering parameters can be made real. This happens to be all of them, in the N=3 case, but not for the case when N>3. Nevertheless, it can be chosen to address the largest mutual couplings first. An N-line coupler such as the 3-line strip line coupler of FIG. 8B may be designed to provide the same coupling magnitudes as the N couplings targeted for annulment, resulting in zeros appearing in those positions of the scattering matrix. The remaining matrix can now be partitioned into groups of modes that are coupled among themselves, but not to other groups. Then each group can have the intra-group couplings annulled, if necessary, by a recursive application of the method. For these more complex cases, and where bandpass filtering is in any case desired for each channel, an adaptation of the coupled filter methods may be used to annul all undesired mutual couplings between the antenna, thus improving transmitter performance in terms of back-intermodulation and efficiency, with similar benefits for reception.

In summary, the multiple antenna system described herein is used in conjunction with multiple transmitter channels and/or multiple receiver channels. A passive RF coupling network connects to the multiple antennas in such a way as to provide independent feed points for multiple transmitters or multiple receivers or both. Each feed point matches a desired characteristic impedance and connects to a respective transmitter power amplifier or receiver downconverter channel, or both, via duplexing filters or transmit/receive switches. The transmitter power amplifiers are driven by respective demodulators which accept respective complex numerical modulation sample streams from a digital signal processor. Reciprocally, the receiver downconverters deliver digitized receive samples from each downconverter channel to digital signal processing. The digital signal processing can comprise processing the multiple transmit or receive sample streams through a matrix operation representing the inverse of the operation of the passive RF coupling network so that individual transmit or receive sample streams are associated with a single antenna. In one implementation, a two-antenna system is described having sum and difference or even and odd orthogonal modes, in which the two antennas are connected via selected transmission line lengths to a 90° directional coupler 100, where the line lengths and the coupler's coupling factor being chosen to annul mutual coupling between the antennas. Such a directional coupler 110 and transmission line implementation adds negligible loss to the antenna system, and may increase the gain of the transmitted and/or received signals.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An antenna system for a communication terminal comprising:
    a directional coupler comprising multiple communication ports that each connect to a respective antenna port;
    a plurality of antennas; and
    a plurality of transmission lines, each connecting the antenna ports of the directional coupler to respective antennas, wherein the lengths of the transmission lines are selected so that antenna crosstalk signals caused by mutual coupling between the antennas and coupled signals produced by the directional coupler have opposite phase at the communication ports of the directional coupler.

2. The antenna system of claim 1 further comprising a plurality of transmitters, each connected to a different communication port of the directional coupler.

3. The antenna system of claim 2 wherein the selected transmission line lengths further enable the antenna crosstalk signals and transmission signals to be in phase at the antenna ports of the directional coupler.

4. The antenna system of claim 1 wherein the directional coupler comprises a plurality of conductive traces disposed on a multi-layer printed circuit board in a predetermined pattern.

5. The antenna system of claim 4 wherein the directional coupler is substantially lossless.

6. The antenna system of claim 1 wherein the directional coupler comprises a quadrature coupler.

7. The antenna system of claim 1 wherein coupling factors associated with the directional coupler and the mutual coupling between the corresponding antennas are equal in magnitude so that the amplitude of the antenna crosstalk signals and the amplitude of the coupled signals are substantially the same at the communication ports of the directional coupler.

8. The antenna system of claim 1 further comprising a plurality of receivers, each connected to a different communication port of the directional coupler.

9. A communication terminal comprising:
    a directional coupler comprising multiple communication ports that each connect to a respective antenna port;
    a plurality of transmitters, each connected to a different communication port of the directional coupler; and
    a plurality of transmission lines, each connecting the antenna ports of the directional coupler to respective antennas, wherein the lengths of the transmission lines are selected to decouple the transmitters such that antenna crosstalk signals received during signal transmission and coupled signals produced by the directional coupler have opposite phase at the communication ports of the directional coupler.

10. The communication terminal of claim 9 wherein the selected transmission line lengths further enable the antenna crosstalk signals and the transmission signals to be in phase at the antenna ports of the directional coupler.

11. The communication terminal of claim 9 wherein the directional coupler comprises a plurality of conductive traces disposed on a multi-layer printed circuit board in a predetermined pattern.

12. The communication terminal of claim 11 wherein the directional coupler is substantially lossless.

13. The communication terminal of claim 9 wherein coupling factors associated with the directional coupler and the mutual coupling between the corresponding antennas are equal in magnitude so that the amplitude of the antenna crosstalk signals and the amplitude of the coupled signals are substantially the same at the communication ports of the directional coupler.

14. A communication terminal comprising:
    a directional coupler comprising multiple communication ports that each connect to a respective antenna port;
    a plurality of receivers, each connected to a different communication port of the directional coupler; and
    a plurality of transmission lines connecting the antenna ports of the directional coupler to respective antennas, the lengths of the transmission lines selected such that antenna crosstalk signals caused by mutual coupling between the antennas and coupled signals produced by the directional coupler have opposite phase at the communication ports of the directional coupler.

15. The communication terminal of claim 14 wherein the selected transmission line lengths further enable the antenna crosstalk signals to be substantially in phase with the coupled signals at the antenna ports of the directional coupler.

16. The communication terminal of claim 14 wherein the directional coupler comprises a plurality of conductive traces disposed on a multi-layer printed circuit board in a predetermined pattern.

17. The communication terminal of claim 16 wherein the directional coupler is lossless.

18. The communication terminal of claim 14 wherein coupling factors associated with the directional coupler and the mutual coupling between the corresponding antennas are equal in magnitude.

* * * * *